(No Model.)
E. E. STEVENSON.
DRAFT EQUALIZER.
No. 280,876. Patented July 10, 1883.
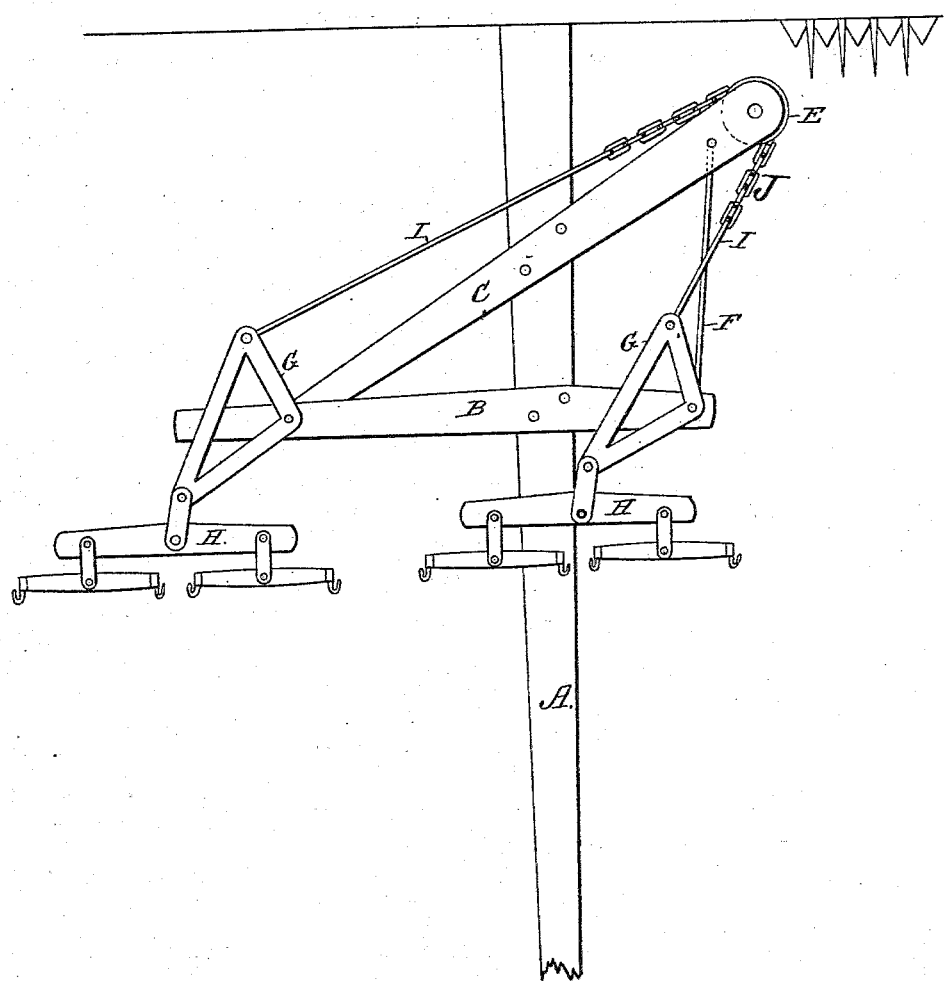
WITNESSES:
W. W. Hollingsworth
A. G. Syne
INVENTOR:
E. E. Stevenson
BY
ATTORNEYS.

UNITED STATES PATENT OFFICE.

ELMER E. STEVENSON, OF QUINCY, MINNESOTA.

DRAFT-EQUALIZER.

SPECIFICATION forming part of Letters Patent No. 280,876, dated July 10, 1883.

Application filed November 6, 1882. (No model.)

*To all whom it may concern:*

Be it known that I, ELMER ELLSWORTH STEVENSON, of Quincy, in the county of Olmsted and State of Minnesota, have invented a new and useful Improvement in Draft-Equalizers for Harvesters, Plows, &c., of which the following is a full, clear, and exact description, reference being had to the annexed drawing, forming part of this specification.

This invention relates to devices for equalizing the draft of two or more horses; and the invention consists of the novel construction hereinafter described and claimed.

The drawing is a plan view of my invention, showing part of a harvester.

A indicates the tongue of a harvester, to which is secured a transverse bar, B, extending farther therefrom at the off side than at the opposite side. The end of this bar at the off side is braced by an oblique bar, C, which also is secured to the tongue, and which projects rearward to a point near the sickle-bar D. The bar C is provided with a pulley, E, supported in its end at the near side of the tongue, and is connected to the near end of the bar B by a stay-rod, F. Near the ends of the bar B are pivoted draft-connections G G, which I prefer to make of triangular form, but which may be of any desired form, provided they are pivoted at a point near the margin thereof, so that they may oscillate when the line of draft is thrown unequally through two other points therein. The parts G are preferably made in the form of an obtuse-angle triangle, and are pivoted to the bar B at their obtuse angles, while their acute angles are connected to the whiffletrees H H and to rods I I, which latter are connected together by a chain, J, passing over the pulley E. It is designed that the inner one of the two whiffletrees shall be supported with its transverse center about on a line with the tongue A, in order that three of the four horses, when four horses are used, shall be on the off side of the tongue and one on the near side. With this construction the draft will be so equalized that the machine will move in a straight line with any desired number of horses attached thereto on the off side of the tongue.

The above description applies particularly to left-hand harvesters, plows, &c.; but it is evident that the invention may be adapted to right-hand machines without involving any essential change of construction.

Having thus described my invention, what I claim, and desire to secure by Letters Patent, is—

1. A draft-equalizer consisting of a bar secured transversely to the tongue of a vehicle or machine, and extended farther to one side thereof than the other, and two oscillatory devices pivoted to the ends of said bar in the same relative position, and connected to each other by a chain and pulley, substantially as shown and described, whereby the draft of one horse may be equalized against that of three.

2. The tongue having the transverse bar projecting farthest at the off side, and the oblique bar adapted to brace the transverse bar and carrying a pulley at its inner end, in combination with the triangular draft-connections and the rods and chain connecting the same, substantially as shown and described.

ELMER ELLSWORTH STEVENSON.

Witnesses:
THOMAS STEVENSON, Jr.,
E. J. DOWLING.